United States Patent
Ridgeway et al.

(10) Patent No.: US 9,312,547 B2
(45) Date of Patent: Apr. 12, 2016

(54) APPLYING A SEAL TO A FUEL CELL COMPONENT

(75) Inventors: Kristoffer Ridgeway, Simsbury, CT (US); John F. Hoffman, Springfield, MA (US)

(73) Assignee: Audi AG, Ingolstadt (DE)

( * ) Notice: Subject to any disclaimer, the term of this patent is extended or adjusted under 35 U.S.C. 154(b) by 306 days.

(21) Appl. No.: 13/641,132

(22) PCT Filed: May 12, 2010

(86) PCT No.: PCT/US2010/034489
§ 371 (c)(1),
(2), (4) Date: Oct. 15, 2012

(87) PCT Pub. No.: WO2011/142750
PCT Pub. Date: Nov. 17, 2011

(65) Prior Publication Data
US 2013/0052565 A1    Feb. 28, 2013

(51) Int. Cl.
*H01M 8/02* (2006.01)
*H01M 8/10* (2006.01)

(52) U.S. Cl.
CPC .......... *H01M 8/0223* (2013.01); *H01M 8/0213* (2013.01); *H01M 8/0273* (2013.01); *H01M 8/0284* (2013.01); *H01M 8/0286* (2013.01); H01M 2008/1095 (2013.01); Y02E 60/50 (2013.01)

(58) Field of Classification Search
CPC ............ H01M 8/0213; H01M 8/0271–8/0286
USPC ................. 429/456–457, 507–510, 512–514, 429/517–522
See application file for complete search history.

(56) References Cited

U.S. PATENT DOCUMENTS

| | | | | |
|---|---|---|---|---|
| 4,909,883 | A | * | 3/1990 | Adell ............................ 156/247 |
| 6,190,751 | B1 | * | 2/2001 | Sylvester ..................... 428/66.4 |
| 6,261,711 | B1 | * | 7/2001 | Matlock et al. ............... 429/513 |
| 2002/0150810 | A1 | | 10/2002 | Mizuno |
| 2004/0053099 | A1 | * | 3/2004 | Franklin ................. H01M 2/08 429/437 |
| 2004/0119056 | A1 | * | 6/2004 | Hofmann et al. ............. 252/500 |
| 2004/0241525 | A1 | * | 12/2004 | Mekala et al. .................. 429/36 |
| 2005/0089746 | A1 | * | 4/2005 | James et al. .................... 429/35 |

(Continued)

FOREIGN PATENT DOCUMENTS

| | | |
|---|---|---|
| JP | 2002151112 A | 5/2002 |
| KR | 100559325 | 3/2006 |
| KR | 100646953 B1 | 11/2006 |

OTHER PUBLICATIONS

International Preliminary Report on Patentability for International Application No. PCT/US2010/034489, dated Nov. 22, 2012.

(Continued)

*Primary Examiner* — Jonathan Crepeau
*Assistant Examiner* — Jacob Buchanan
(74) *Attorney, Agent, or Firm* — Seed IP Law Group PLLC

(57) ABSTRACT

An exemplary method of applying a seal to a fuel cell component includes providing a release layer on one side of a seal. The release layer has reinforcing fibers. Another side of the seal is placed against a selected portion of the fuel cell component. The seal, release layer and fuel cell component are heated. The release layer is then removed after the seal is secured to the fuel cell component.

20 Claims, 2 Drawing Sheets

(56) References Cited

U.S. PATENT DOCUMENTS

2006/0073373 A1* 4/2006 Andrin ............... H01M 8/0247
 429/483
2008/0142152 A1* 6/2008 Debe et al. ................... 156/182

OTHER PUBLICATIONS

International Search Report and Written Opinion of the International Searching Authority for International application No. PCT/US2010/034489 dated Feb. 24, 2011.

* cited by examiner

APPLYING A SEAL TO A FUEL CELL COMPONENT

BACKGROUND

Fuel cells are useful for generating electric power. Typical fuel cell arrangements include a plurality of individual cells in a stack that is referred to as a cell stack assembly (CSA). There are various challenges associated with manufacturing and operating CSAs. For example, different fluids are introduced into to or removed from the CSA during fuel cell operation. It is necessary to maintain those fluids within specified areas in the CSA.

Typical CSAs include a significant number of components. Each individual cell includes multiple layers. There are interfaces between the different layers of each cell and between adjacent cells. Some of those interfaces require a seal to maintain the fluids within the CSA appropriately to achieve desired fuel cell operation.

The various materials that are used for fuel cell components make it difficult to achieve an adequate seal.

SUMMARY

An exemplary method of applying a seal to a fuel cell component includes providing a release layer on one side of a seal. The release layer has reinforcing fibers. Another side of the seal is placed against a selected portion of the fuel cell component. The seal, release layer and fuel cell component are heated. The release layer is then removed after the seal is secured to the fuel cell component.

The reinforcing fibers in the release layer have a coefficient of thermal expansion that is very close to the coefficient of thermal expansion of the material used for the fuel cell component. This effectively prevents the seal material from expanding beyond a desired location during the heating portion of the process for securing the seal to the fuel cell component.

An exemplary fuel cell component includes a plate. A seal is received against a selected portion of the plate. A fiber reinforced release layer is on a side of the seal that faces away from the plate.

The various features and advantages of a disclosed example will be apparent to those skilled in the art from the following detailed description. The drawings that accompany the detailed description can be briefly described as follows.

DETAILED DESCRIPTION

Figure 1:
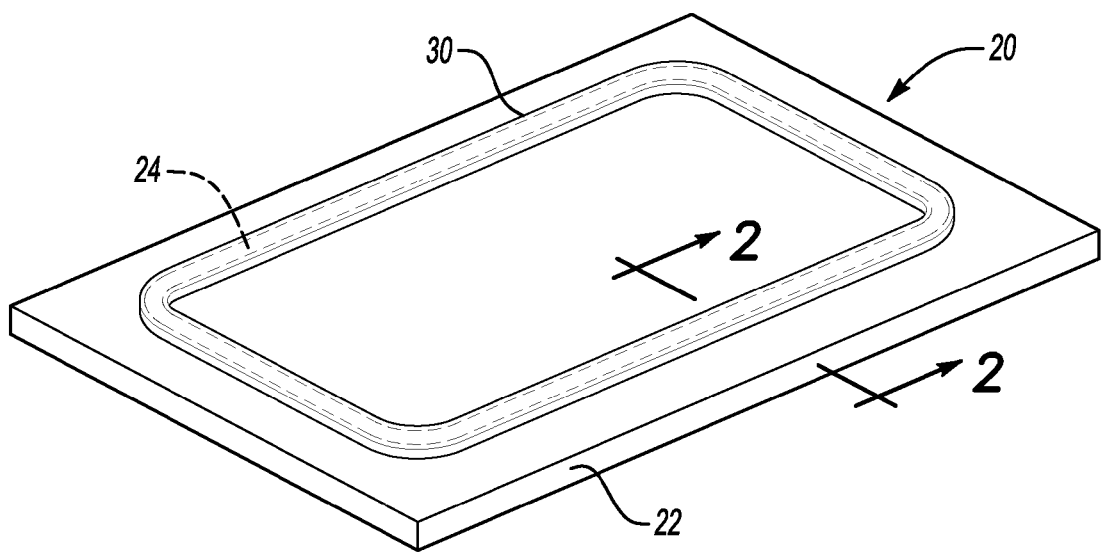
FIG. 1 diagrammatically illustrates an exemplary fuel cell component designed according to an embodiment of this invention.

FIG. 1 shows an exemplary fuel cell component 20 that comprises a plate 22 and a seal 24. In one example, the fuel cell component 20 comprises a bipolar plate. In one example the plates 22 comprises carbon. The seal 24 comprises an elastomer. One example seal comprises rubber.

Figure 2:
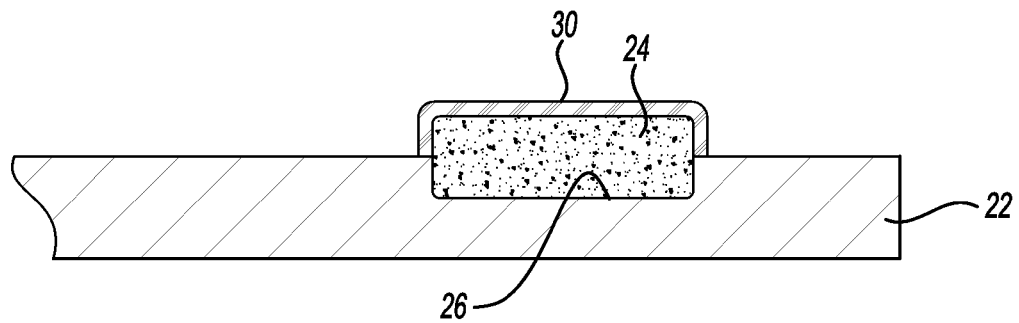
FIG. 2 is a cross-sectional illustration taken along the lines 2-2 in FIG. 1.

As shown in FIG. 2, the seal 24 is at least partially received within a recess or groove 26 that is formed in the plate 22. One challenge associated with providing the plate 22 with the seal 24 is maintaining the material of the seal 24 within the selected area on the plate 22 during the process of securing the seal in place. The illustrated example includes a release layer 30 that is reinforced with fibers. The release layer 30 facilitates removing the fuel cell component from a fixture used for securing the seal 24 in place. The release layer in this example also facilitates maintaining the material of the seal 24 in the desired location relative to the plate 22.

Figure 3:
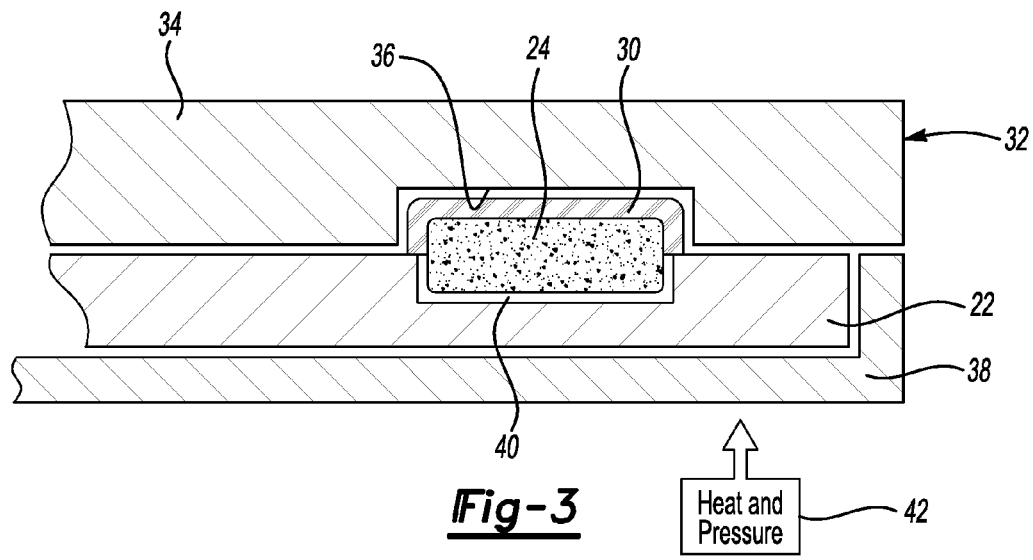
FIG. 3 schematically illustrates an exemplary procedure for assembling a fuel cell component.

FIG. 3 schematically illustrates an arrangement for securing the seal 24 in place. In this example, a fixture or mold 32 has one portion 34 that includes a groove 36 that is configured to at least partially receive a portion of the seal 24. In this example, the release layer 30 is received against the groove 36. Another portion 38 of the fixture 32 supports the plate 22 during the assembly process.

The example of FIG. 3 includes a thermoplastic bond film 40 on a side of the seal 24 that faces opposite the side on which the release layer 30 is positioned. When the various portions of the fuel cell component 20 are appropriately positioned within the fixture 32, heat and pressure are applied as schematically shown at 42. The heat causes the thermoplastic bond film 40 to melt to thereby secure the seal 24 to the plate 22.

During the heating portion of the process the materials tend to expand. A significant challenge associated with providing an elastomer seal on a carbon plate, for example, is that the coefficient of thermal expansion of carbon is much less than that of an elastomer such as rubber. The release film 30 includes reinforcing fibers 50 (schematically shown in FIG. 4) to maintain the material of the seal 24 in the desired location during the process of securing the seal 24 to the plate 22. The reinforcing fibers 50 have a coefficient of thermal expansion that is very close to the coefficient of thermal expansion of the material of the plate 22 (e.g., carbon). In one example, the coefficient of thermal expansion of the reinforcing fibers 50 approximately equals that of the material of the plate 22. Having reinforcing fibers within the release layer 30 with a coefficient of thermal expansion similar to that of the material of the plate 22 prevents the seal material from expanding in a manner where the seal would leave the desired area of the plate 22.

In one example, the reinforcing fibers 50 comprise carbon. The carbon fibers 50 and the carbon material of the plate 22 in such an example have the same coefficient of thermal expansion. Another example includes fibers 50 that comprise glass, which has a coefficient of thermal expansion similar to that of carbon. For example, glass typically has a linear coefficient of thermal expansion of 8.5 and the coefficient of thermal expansion of carbon graphite may be 0.5 and up to 6.5. For purposes of this description 8.5 and 0.5 are considered similar especially when compared to that of an elastomer seal material, which may be approximately 75. Any reinforcing fibers that have a coefficient of thermal expansion that is close to that of the material used for the plate 22 will effectively compensate for the difference in coefficient of thermal expansion of the seal material and the plate material.

The arrangement of the fibers 50 holds the material of the seal 24 from expanding throughout the path of the seal 24 so that it remains in the correct position on the plate 22. Some examples include fibers 50 arranged in a raised matrix or grid pattern. Other examples include a weave of the fibers 50. The arrangement of the fibers 50 is operative to constrain the material of the seal material during the bonding process.

Another feature of the release layer 30 is that it protects the seal 24 from contamination that may exist on the fixture 32.

Figure 4:
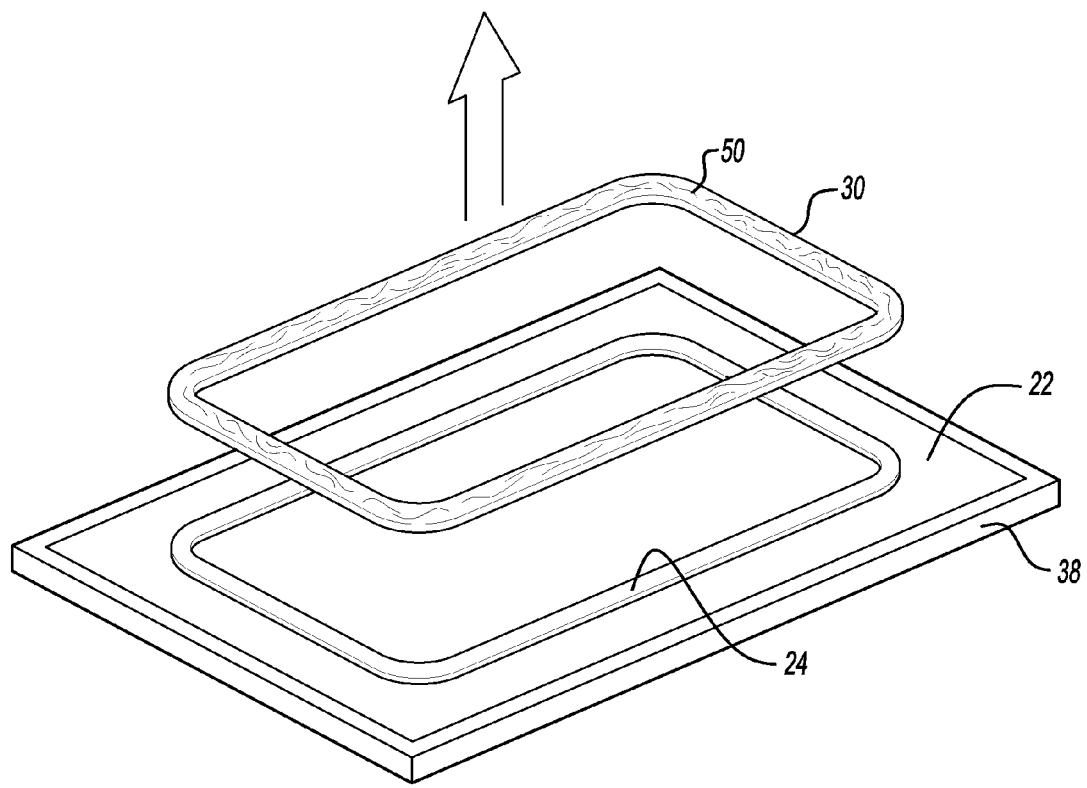
FIG. 4 schematically illustrates another portion of the exemplary procedure.

After the plate 22 and the seal 24 have cooled, the seal 24 is secured in place. The release layer 30 can then be removed as schematically shown in FIG. 4. The seal 24 and plate 22 are then ready for the fuel cell component 20 to be incorporated into a CSA.

In one example, the release layer 30 comprises a polymer film including the reinforcing fibers 50. One example includes using polytetraflouroethylene and glass reinforcing fibers for the release layer 30. Another example includes a low surface energy plastic as the polymer with an appropriate reinforcing fiber material selected for its coefficient of thermal expansion to correspond to that of the material used for the plate 22. In one example, the fibers 50 are generally continuous along the release layer 30. The orientation and length of the fibers 50 provide sufficient control over expansion of the material of the seal 24 during the bonding process.

The illustrated example allows for bonding an elastomer seal with a high coefficient of thermal expansion to a fuel cell component such as a bipolar plate that has a low coefficient of thermal expansion. In this example, the seal is effectively trapped between materials having a similar coefficient of thermal expansion, which works against the tendency the seal material would have to expand in an undesired manner. The illustrated example provides a reliable assembly process that results in a seal having desired characteristics and placement relative to the fuel cell component.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of applying a seal to a fuel cell component, comprising:
    positioning a release layer in direct contact with top and side surfaces of the seal and in direct contact with a surface of the fuel cell component, the release layer including reinforcing fibers;
    placing a bottom of the seal against a selected portion of the fuel cell component;
    securing the seal to the fuel cell component by heating the fuel cell component, the seal, and the release layer, the securing including constraining exposed surfaces of the top and side surfaces of the seal with the release layer and the reinforcing fibers; and
    removing the release layer after the securing.

2. The method of claim 1, further comprising:
    positioning the fuel cell component against a first side of a fixture; and
    positioning a second side of the fixture that is opposite to the first side against the release layer; and
    maintaining the seal against the selected portion of the fuel cell component during the heating, the seal being separated from the fixture by the release layer.

3. The method of claim 1, wherein the release layer comprises a polymer and the reinforcing fibers.

4. The method of claim 3, wherein the polymer comprises polytetraflouroethylene.

5. The method of claim 1, wherein the fuel cell component has a first coefficient of thermal expansion and the reinforcing fibers have a second coefficient of thermal expansion that is approximately equal the first coefficient of thermal expansion.

6. The method of claim 5, wherein the seal has a third coefficient of thermal expansion that is greater than the second coefficient of thermal expansion.

7. The method of claim 6, wherein the fuel cell component comprises a carbon plate, the seal comprises an elastomer material, and the reinforcing fibers comprise glass.

8. The method of claim 1, wherein the reinforcing fibers are continuous along the release layer.

9. The method of claim 1, wherein the selected portion of the fuel cell component comprises a groove, the seal is received at least partially within the groove and the release layer covers over any of the seal that is outside of the groove.

10. The method of claim 1, further comprising:
    providing a thermoplastic bond film on the bottom of the seal; and
    melting the thermoplastic bond film during the heating.

11. The method of claim 1, further comprising maintaining the seal in a location partially within a groove of the selected portion of the fuel cell component with the release layer during the securing.

12. The method of claim 1 wherein constraining includes encapsulating the seal with the release layer, the reinforcing fibers, and the selected portion of the fuel cell component during the securing.

13. The method of claim 1, further comprising completely enclosing the seal with the release layer, the reinforcing fibers, and the selected portion of the fuel cell component during the securing.

14. The method of claim 1, wherein:
    placing the bottom of the seal against the selected portion of the fuel cell component includes placing the bottom of the seal within a groove in the fuel cell component such that the top of the seal and portions of a first side of the seal and a second side of the seal are outside of the groove; and
    positioning the release layer in direct contact with the top and side surfaces of the seal includes covering the top of the seal and the portions of the first side of the seal and the second side of the seal with the release layer and the reinforcing fibers.

15. The method of claim 1, further comprising positioning the release layer in contact with the fuel cell component beside the seal.

16. The method of claim 1, wherein positioning the release layer in direct contact with the top and side surfaces of the seal and placing the bottom of the seal against the selected portion of the fuel cell component includes positioning the release layer to abut the fuel cell component.

17. The method of claim 1, further comprising providing a thermoplastic bond film between the bottom of the seal and the selected portion of the fuel cell component, and positioning the release layer to abut the fuel cell component and the thermoplastic bond film.

18. A method comprising:
    positioning a release layer including reinforcing fibers over a seal;
    positioning the seal on a fuel cell plate;
    bonding the seal to the fuel cell plate by applying heat to the seal, the release layer being in direct contact with top and side surfaces of the seal and in direct contact with a surface of the fuel cell plate during the bonding;
    constraining expansion of the seal and movement of the seal with respect to the fuel cell plate with the release layer during the bonding; and
    removing the release layer and reinforcing fibers from the seal and the fuel cell plate.

19. The method of claim 18 wherein the fuel cell plate includes a carbon fuel cell plate, the seal comprises an elastomeric seal, and the reinforcing fibers comprise glass reinforcing fibers.

20. The method of claim 18, further comprising positioning a thermoplastic bond film between the seal and the fuel cell plate and positioning the release layer to abut the thermoplastic bond film.

* * * * *